(12) United States Patent
Hattori

(10) Patent No.: US 11,364,774 B2
(45) Date of Patent: Jun. 21, 2022

(54) WIND DIRECTION ADJUSTMENT DEVICE

(71) Applicant: NIHON PLAST CO., LTD., Shizuoka (JP)

(72) Inventor: Akio Hattori, Shizuoka (JP)

(73) Assignee: NIHON PLAST CO., LTD., Shizuoka (JP)

( * ) Notice: Subject to any disclaimer, the term of this patent is extended or adjusted under 35 U.S.C. 154(b) by 21 days.

(21) Appl. No.: 16/591,665

(22) Filed: Oct. 3, 2019

(65) Prior Publication Data

US 2020/0108697 A1  Apr. 9, 2020

(30) Foreign Application Priority Data

Oct. 3, 2018 (JP) .............................. JP2018-188358

(51) Int. Cl.
*B60H 1/34* (2006.01)

(52) U.S. Cl.
CPC ................... *B60H 1/3442* (2013.01)

(58) Field of Classification Search
CPC ...... B60H 1/3442; B60H 1/3414; B60H 1/34; B60H 1/3435; F24F 13/065
USPC ....................................................... 454/154
See application file for complete search history.

(56) References Cited

U.S. PATENT DOCUMENTS

| | | |
|---|---|---|
| 2015/0202946 A1 | 7/2015 | Inagaki et al. |
| 2017/0057328 A1* | 3/2017 | Sano .................... B60H 1/3442 |

FOREIGN PATENT DOCUMENTS

| | | | |
|---|---|---|---|
| DE | 102014018302 A1 | 6/2016 | |
| EP | 3103664 A1 | 12/2016 | |
| JP | 2014-034280 A | 2/2014 | |
| WO | WO-2014203545 A1 * | 12/2014 | ........... B60H 1/3442 |

OTHER PUBLICATIONS

German Office Action dated Oct. 13, 2020, File Reference: 102019126451.0.

* cited by examiner

*Primary Examiner* — Jessica Yuen
(74) *Attorney, Agent, or Firm* — Brundidge & Stanger, PC.

(57) ABSTRACT

Wind direction adjustment device is provided with cylindrical case body, movable louver including manipulation knob, and support section which supports movable louver inside the case body such that movable louver is capable of pivoting. Support section is provided with link which is provided on one of the case body side and the movable louver side and includes ball portion, at least a portion of which is on a coaxial line with manipulation knob at a neutral position of movable louver. Support section is provided with bearing portion which is provided on the other of the case body side and the movable louver side and receives ball portion. Support section is provided with protruding portion which is provided on movable louver. Support section is provided with stopper portion which is provided on link and sets a pivoting end of movable louver by abutting against protruding portion.

4 Claims, 2 Drawing Sheets

WIND DIRECTION ADJUSTMENT DEVICE

CROSS REFERENCE TO RELATED APPLICATIONS

This application is entitled to and claims the benefit of Japanese Patent Application No. 2018-188358, filed on Oct. 3, 2018, the disclosure of which including the specification, drawings and abstract is incorporated herein by reference in its entity.

TECHNICAL FIELD

The present invention relates to a wind direction adjustment device provided with a support section which supports a movable louver inside a case body such that the movable louver is capable of pivoting.

BACKGROUND ART

In the related art, in an air conditioning apparatus used in a vehicle such as an automobile, a wind direction adjustment device provided with an outlet which blows out wind is also referred to as an air conditioning blowing device, an air outlet, a ventilator, a register, or the like, is installed in various parts of a vehicle such as the instrument panel or the center console section, for example, and the wind direction adjustment device contributes to an improvement in comfort performance through heating and cooling.

For the wind direction adjustment device, there is known a configuration provided with a cylindrical movable louver inside a case body formed in a cylindrical shape, for example, and a wind direction is adjusted by tilt manipulation of the movable louver in an arbitrary direction inside the case body. In this configuration, a ball joint section axially supporting the movable louver to pivot freely is provided on a center axis of the case body. A knob for a passenger to perform pivot manipulation on the movable louver is provided in a center portion of the movable louver. The wind direction adjustment device is set to have a stopper function for ensuring that the movable louver does not pivot by an amount greater than or equal to a fixed amount with respect to the case body. The stopper function is configured such that the movable louver does not pivot any further due to an outer edge portion of the movable louver and another part in the periphery abutting each other (for example, refer to PTL 1).

CITATION LIST

Patent Literature

PTL 1 Japanese Patent Application Laid-Open No. 2014-34280 (pages 9 to 10, FIGS. 16 and 18)

SUMMARY OF INVENTION

Technical Problem

In a case of the configuration described above, the passenger often pushes again to confirm that the movable louver will not pivot any further even in a state in which the stopper function is operating. Therefore, by having the stopper function on the outer edge portion of the movable louver at a position furthest from the knob of the center portion of the movable louver directly pinched by the passenger, there is a possibility that detachment occurs at the ball joint section when the passenger pushes in the knob by greater than or equal to a predetermined amount.

The present invention is made in light of these points and an object thereof is to provide a wind direction adjustment device capable of stably maintaining pivoting manipulability of a movable louver.

Solution to Problem

A wind direction adjustment device according to claim 1 includes a cylindrical case body, a movable louver provided with a manipulation portion, and a support section which pivotably supports the movable louver inside the case body, in which the support section includes a pivoting base portion which is provided on one of the case body side and the movable louver side, a ball portion which is provided on the pivoting base portion and at least a portion of the ball portion is positioned on a coaxial line with the manipulation portion at a neutral position of the movable louver, a ball accommodating portion which is provided on the other of the case body side and the movable louver side and accommodates the ball portion, one abutting portion which is provided on the movable louver, and another abutting portion which is provided on the pivoting base portion and sets a pivoting end of the movable louver by abutting against the one abutting portion.

In the wind direction adjustment device according to claim 2, in the wind direction adjustment device according to claim 1, the another abutting portion is formed to include a portion of the ball portion.

In the wind direction adjustment device according to claim 3, the wind direction adjustment device according to claim 2, further includes a soft member which covers at least a portion of the ball portion and forms the another abutting portion.

In the wind direction adjustment device according to claim 4, in the wind direction adjustment device according to any one of claims 1 to 3, the one abutting portion is provided on the ball accommodating portion.

Advantageous Effects of Invention

According to the wind direction adjustment device according to claim 1, when a passenger manipulates the manipulation portion to cause the movable louver to pivot, even in a case in which the passenger further pushes in the movable louver from a position at which the one abutting portion and the another abutting portion abut against each other, detachment does not occur easily in the accommodation mechanism between the ball portion and the ball accommodating portion and it is possible to stably maintain pivoting manipulability of the movable louver.

According to the wind direction adjustment device according to claim 2, in addition to the effect of the wind direction adjustment device according to claim 1, by forming the another abutting portion on the ball portion, it is possible to cause the abutting position between the one abutting portion and the another abutting portion to further approach the accommodating position of the ball accommodating portion which accommodates the ball portion, it is possible to further suppress the force acting on the abutting position between the one abutting portion and the another abutting portion, and it is possible to more stably maintain the pivoting manipulability of the movable louver.

According to the wind direction adjustment device according to claim 3, in addition to the effect of the wind direction adjustment device according to claim 2, by forming the another abutting portion using the soft member which covers at least a portion of the ball portion, it is possible to use the soft member which sets the pivoting load between the ball portion and the ball accommodating portion and to suppress the hitting sound which occurs when the one abutting portion and the another abutting portion abut against each other.

According to the wind direction adjustment device according to claim 4, in addition to the effect of the wind direction adjustment device according to any one of claims 1 to 3, by providing the one abutting portion on the ball accommodating portion, it is possible to cause the abutting position between the one abutting portion and the another abutting portion to further approach the accommodating position of the ball accommodating portion which accommodates the ball portion, it is possible to further suppress the force acting on the abutting position between the one abutting portion and the another abutting portion, and it is possible to more stably maintain the pivoting manipulability of the movable louver.

DESCRIPTION OF EMBODIMENTS

Hereinafter, an embodiment of the present invention will be described with reference to the drawings.

Figure 1:
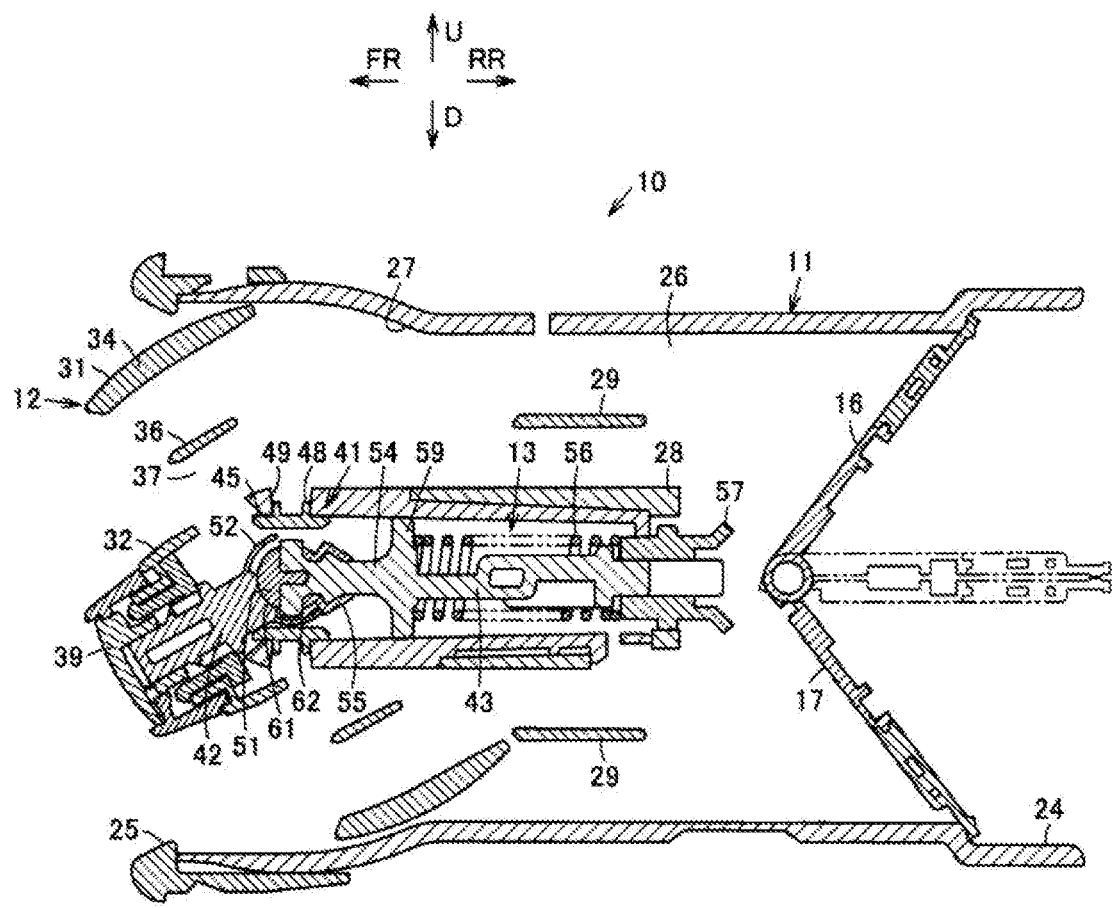
FIG. 1 is a cross-sectional view of illustrating a wind direction adjustment device of an embodiment of the present invention.
Figure 4:
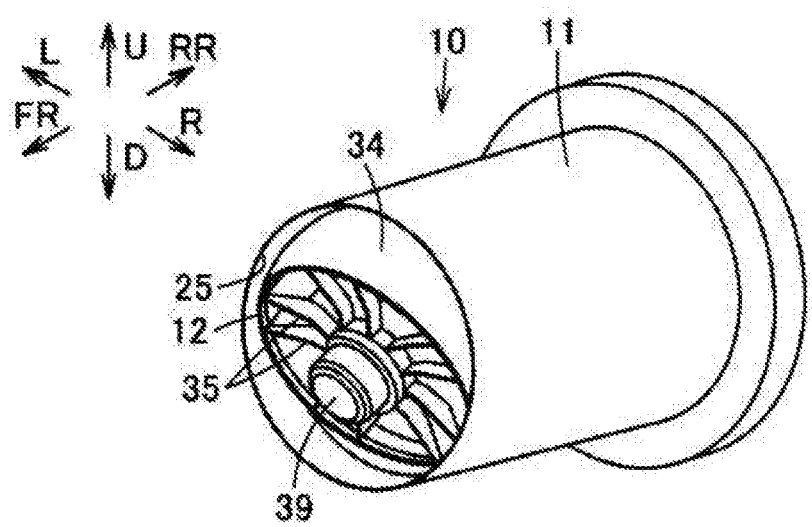
FIG. 4 is a perspective view of the wind direction adjustment device.

In FIGS. 1 and 4, 10 illustrates a wind direction adjustment device. Wind direction adjustment device 10 is for air conditioning in which the direction of the wind from an air conditioning apparatus or the like provided in a vehicle such as an automobile is adjusted, for example. Although not illustrated, wind direction adjustment device 10 is installed on an interior member of the automobile, for example, an installation target portion of an installment panel, a center console, an overhead console portion, a center pillar, a door rim, or the like. In the present embodiment, wind direction adjustment device 10 is set to be round.

Figure 2:
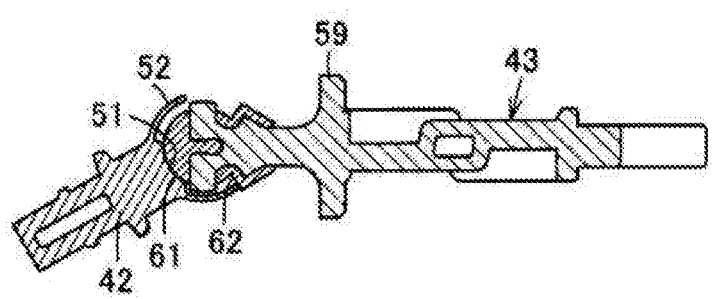
FIG. 2 is a cross-sectional view illustrating a support section of the wind direction adjustment device.

Wind direction adjustment device 10 is referred to as an air outlet, a ventilator, a register, or the like, and as illustrated in FIGS. 1 and 2, is provided with case body 11, movable louver 12, and support section 13 which supports movable louver 12 to be capable of pivoting in all directions inside case body 11. Wind direction adjustment device 10 may be provided with one or more valves 16 and 17 which serve as opening/closing bodies (valve bodies) which open and close the inside of case body 11.

Case body 11 includes circular receiving port 24 which is an inlet which receives the wind from the air conditioning apparatus or the like, for example, on one end side and includes circular exposure opening 25 which communicates with receiving port 24 and is surrounded by movable louver 12. Flow path 26 which causes receiving port 24 and exposure opening 25 to communicate and allows the wind to pass therethrough is formed inside case body 11. Louver storage section 27 is provided in case body 11 on exposure opening 25 side such that movable louver 12 is positioned in the inside of louver storage section 27 and the diameter of louver storage section 27 is expanded in a spherical manner. Shaft bearing section 28 is provided along center axis of case body 11 inside case body 11. Rectifying section 29 may be provided inside case body 11. Hereinafter, a downstream side of the wind passing from receiving port 24 side toward exposure opening 25 side through flow path 26 inside case body 11 is a front side (arrow FR side), an upstream side is a read side (arrow RR side), horizontal directions or width directions orthogonally intersecting the front and rear directions (arrows FR and RR directions) are left/right directions (arrows L and R directions) as viewed from the front side, directions orthogonally intersecting the front/rear directions and the left/right directions are up/down directions (arrows U and D directions), and a description will be given of an embodiment with this premise. A circumferential direction may also refer to a direction along an arc centered on a center axis on a plane orthogonally intersecting the center axis of case body 11.

Shaft bearing section 28 is a portion holding support section 13 and supporting movable louver 12 to be capable of pivoting. Shaft bearing section 28 is provided to be long and cylindrical along the front/rear directions which are the axial directions of case body 11.

Rectifying section 29 rectifies the wind passing through flow path 26. Rectifying section 29 is provided to be cylindrical and coaxial with case body 11 and shaft bearing section 28 in the vicinity of shaft bearing section 28, for example. That is, rectifying section 29 is provided to be long and cylindrical along the front/rear directions. Rectifying section 29 is positioned between movable louver 12 and valves 16 and 17 in the front/rear directions of case body 11. Rectifying section 29 is not a mandatory configuration.

Movable louver 12 is also referred to as a bladed body, a housing, or fins and controls the orientation of the wind blown out from wind direction adjustment device 10. Movable louver 12 is provided with louver main body section 31 and louver shaft bearing section 32.

Louver main body section 31 is formed using a synthetic resin or the like which has rigidity, for example. Louver main body section 31 includes cylindrical contour portion 34 and a plurality of blades 35 formed to span the space between contour portion 34 and louver shaft bearing section 32. Blades 35 are joined to one another by cylindrical joining portion 36 disposed to be concentric with contour portion 34. A fan-shaped portion surrounded by contour portion 34, blades 35, and joining portion 36 forms ventilation port 37 which allows a wind to pass therethrough.

The outer circumferential surface of contour portion 34 is formed to have a spherical surface shape and the outer circumferential surface is separated from louver storage section 27 via a minute gap at a position facing louver storage section 27 of case body 11.

Blades 35 are provided radially along a radial direction of louver main body section 31 (movable louver 12) and are separated from one other by a substantially equal interval in the circumferential direction.

Louver shaft bearing section 32 is formed in a cylindrical shape and is disposed to be concentric with contour portion 34. The rear portion of louver shaft bearing section 32 is connected to support section 13. Manipulation knob 39, which serves as a manipulation portion for subjecting movable louver 12 to pivot manipulation with respect to case body 11, is attached to the front portion of louver shaft bearing section 32. Manipulation knob 39 is joined to support section 13 inside louver shaft bearing section 32.

Manipulation knob 39 is disposed coaxially with contour portion 34 on the center portion of movable louver 12.

Support section 13 illustrated in FIG. 1 is a portion which supports movable louver 12 inside case body 11 such that movable louver 12 is capable of pivoting. Support section 13 sets the pivoting load (the torque) of movable louver 12 in relation to case body 11. Support section 13 is provided with joint portion 41, bearing portion 42 which serves as ball accommodating portion which is a support section, and link 43 which serves as pivoting base portion which is another support section.

Joint portion 41 supports movable louver 12 to be capable of pivoting in relation to case body 11. Joint portion 41 is a universal joint in the present embodiment. In other words, joint portion 41 is provided with one shaft support body 45 which is supported on the case body 11 side and another shaft support body (not illustrated) which is supported on the movable louver 12 side, and the one shaft support body 45 and the other shaft support body are joined to be capable of pivoting in direction orthogonally intersecting each other.

The one shaft support body 45 of the present embodiment is supported by shaft bearing section 28 of case body 11 to be capable of pivoting. In the present embodiment, in the one shaft support body 45, a pair of first pivoting shafts 48 is provided such that first pivoting shafts 48 are formed in a cylindrical shape and protrude to the outside at positions on opposite sides from each other interposing a center axis, in the present embodiment, at positions on the top and bottom, first pivoting shafts 48 are supported to be capable of pivoting around a pair of bearings 49 which are open to shaft bearing section 28 and are capable of pivoting in the left/right directions with respect to case body 11. In the one shaft support body 45, a pair of second pivoting shafts (not illustrated) is provided such that second pivoting shafts protrude to the outside at positions on opposite sides from each other interposing a center axis, in the present embodiment, at positions on the left and right, the second pivoting shafts are supported to be capable of pivoting around the other shaft support body, and the other shaft support body is capable of pivoting with respect to the one shaft support body 45 in a direction orthogonally intersecting the pivoting direction of the one shaft support body 45 with respect to case body 11.

The other shaft support body of the present embodiment is fixed to the rear portion of louver shaft bearing section 32 of movable louver 12. Therefore, due to the one shaft support body 45 pivoting around case body 11, movable louver 12 pivots around case body 11 integrally with the other shaft support body, and due to the other shaft support body pivoting around the one shaft support body 45, movable louver 12 pivots around case body 11 integrally with the other shaft support body.

Bearing portion 42 is maintained on the movable louver 12 side. Bearing portion 42 is formed to be longitudinal using a synthetic resin or the like having rigidity, for example. The front side of bearing portion 42 is inserted through the other shaft support body of joint portion 41 and is integrally joined to manipulation knob 39 in louver shaft bearing section 32 of movable louver 12. Therefore, bearing portion 42 is capable of pivoting in the circumferential direction around movable louver 12 through the pivoting manipulation of manipulation knob 39. Bearing portion 42 is positioned inside joint portion 41. As illustrated in FIG. 1 and FIG. 2, bearing portion 42 is provided with spherical surface portion 51 and protruding portion 52 on rear side of bearing portion 42 facing link 43. Spherical surface portion 51 is one sliding portion and protruding portion 52 serves as one abutting portion which is one restricting portion. Spherical surface portion 51 is provided to be recessed in a hemispherical surface shape. Protruding portion 52 is formed in a hemispherical surface shape surrounding the outside of spherical surface portion 51 and the distal end portion of protruding portion 52 extends from a position on the outside in the radial direction with respect to spherical surface portion 51 toward the rear side.

Figure 3:
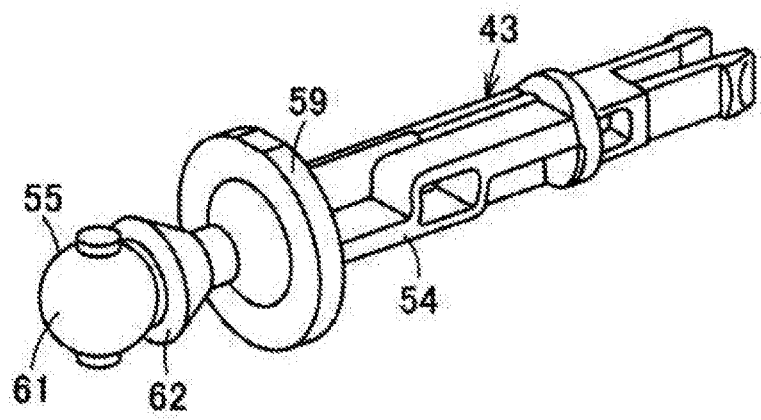
FIG. 3 is a perspective view illustrating a portion of the support section of the wind direction adjustment device.

Link 43 illustrated in FIGS. 1 to 3 is maintained on the case body 11 side. Link 43 is provided with link main body section 54 and soft member 55, for example. Link main body section 54 is an inner member formed to be longitudinal using a synthetic resin having rigidity and soft member 55 is an outer member which covers a portion of link main body section 54 and is molded integrally with link main body section 54. Link 43 is disposed to be capable of moving along an axial direction inside shaft bearing section 28. Link 43 is biased toward the front side which is the movable louver 12 side (the bearing portion 42 side) by coil spring 56 which serves as a biasing section. Gear section 57 which causes valves 16 and 17 to operate is joined to link 43. Gear section 57 meshes with valves 16 and 17 via a joining gear (not illustrated) and causes valves 16 and 17 to perform opening/closing operations by pivoting in the circumferential direction around case body 11.

Collar portion 59 which is a position restricting portion that restricts the position in the radial direction with respect to shaft bearing section 28 is provided to protrude in a flange shape on link main body section 54. Coil spring 56 is attached between collar portion 59 and gear section 57.

Soft member 55 is molded integrally using a synthetic resin, for example, an elastomer (TPV) or the like that is softer than link main body section 54, bearing portion 42, and particularly protruding portion 52. Soft member 55 covers an end portion of the front side of link main body section 54 and is molded integrally with link main body section 54 using two color molding, for example. Soft member 55 is integrally provided with ball portion 61 and stopper portion 62. Ball portion 61 is another sliding portion which slides against spherical surface portion 51 of bearing portion 42 and stopper portion 62 serves as another sliding portion which is another restricting portion that sets a pivoting end of movable louver 12 by abutting against protruding portion 52. Therefore, ball portion 61 and stopper portion 62 are both formed on link 43.

Ball portion 61 configures the end portion of the front side of link 43. Ball portion 61 is a ball portion, the substantial entirety of which is formed in a spherical shape having the same or substantially the same diameter as that of spherical surface portion 51 using soft member 55. The front side of ball portion 61 mates with spherical surface portion 51 of bearing portion 42 and is accommodated by spherical surface portion 51 to be capable of pivoting. Center position of ball portion 61 is positioned on the axial line of first pivoting shaft 48 and the second pivoting shaft of the one shaft support body 45 of joint portion 41. Therefore, the center of ball portion 61 is positioned on the center axis of movable louver 12 in a neutral position, that is, on the same axial line as manipulation knob 39 and is the pivoting center of movable louver 12 with respect to case body 11. Ball portion 61 is pressed against spherical surface portion 51 by the biasing of coil spring 56. As a result, the pivoting load (torque) between ball portion 61 and spherical surface portion 51 is set according to the material properties of soft member 55 which configures ball portion 61, the material properties of the member which configures spherical surface portion 51 (bearing portion 42), and the biasing force of coil spring 56.

Stopper portion 62 is positioned on the rear side with respect to ball portion 61. Stopper portion 62 of the present embodiment is positioned closer to the rear side than the center position of ball portion 61. Stopper portion 62 is formed to be continuously integral with ball portion 61. Stopper portion 62 extends out to a position intersecting the pivoting track of protruding portion 52 of bearing portion 42. In other words, stopper portion 62 to extend in the radial direction to a position at which the distance of stopper portion 62 from the center of ball portion 61 is longer than the distance of stopper portion 62 from the center of ball portion 61 to protruding portion 52. Stopper portion 62 is formed in a frustoconical surface shape expanding from the front side to the rear side and covers the entire circumference of link main body section 54 at this position.

Valves 16 and 17 control the wind amount to be blown out from wind direction adjustment device 10 by controlling the opening/closing amount of flow path 26. Valves 16 and 17 are positioned closer to the rear side than shaft bearing section 28 and each is joined to case body 14 to be capable of pivoting. Valves 16 and 17 are configured such that the opening/closing operations mutually operate together.

Wind direction adjustment device 10 which is installed on an installation target portion of an inner fitting member of an automobile allows a wind which is received from receiving port 24 to pass through flow path 26 and the wind flows from each ventilation port 37 of movable louver 12 toward the front direction of a passenger when movable louver 12 is positioned at a neutral position with valves 16 and 17 in an open state as illustrated by the double-dot line of FIG. 1, that is, when case body 11 and movable louver 12 are substantially coaxial.

Movable louver 12 pivots due to pinching and up/down/ left/right manipulating manipulation knob 39. At this time, movable louver 12 may pivot in an arbitrary direction around the center of ball portion 61 using two mutually and orthogonally intersecting axes according to the structure of joint portion 41. During the manipulation, bearing portion 42 which is joined to manipulation knob 39 pivots together with movable louver 12 and due to ball portion 61 of soft member 55 which is positioned on the front end of link 43 which is held by shaft bearing section 28 of case body 11 being pressure welded by the biasing of coil spring 56, the sliding resistance between the surface of ball portion 61 and spherical surface portion 51 is controlled to be substantially fixed by the biasing of coil spring 56 and movable louver 12 is pivoted at an appropriate manipulation load. As illustrated by the solid line of FIG. 1, the pivoting end of movable louver 12 is restricted by the abutting of protruding portion 52 against stopper portion 62 which is provided to protrude on soft member 55. In a state in which movable louver 12 is pivoted in this manner, the center axis of movable louver 12 is parallel to a direction intersecting the center axis of case body 11 and the wind flows along the center axis of movable louver 12, from each ventilation port 37, toward a direction inclined with respect to the front direction of the passenger.

When manipulation knob 39 is pinched and twisted in the circumferential direction with respect to movable louver 12, bearing portion 42 which operates together with manipulation knob 39 pivots in the circumferential direction. Since ball portion 61 of soft member 55 of link 43 is pressure welded by coil spring 56, when link 43 pivots in the circumferential direction together with gear section 57, valves 16 and 17 are pivoted as illustrated by the solid line of FIG. 1, and valves 16 and 17 reach positions at which valves 16 and 17 abut against case body 11, flow path 26 is blocked and the wind is no longer blown out from ventilation ports 37 of movable louver 12 (a fully-closed state).

In this manner, according to the embodiment, by providing ball portion 61 on link 43 on a coaxial line with manipulation knob 39 at the neutral position of movable louver 12 and providing stopper portion 62 on link 43, when the passenger manipulates manipulation knob 39 to pivot movable louver 12, protruding portion 52 and stopper portion 62 abut against each other at a accommodating position between ball portion 61 and bearing portion 42 (spherical surface portion 51), that is, at a position adjacent to the pivoting center of movable louver 12. Therefore, even in a case in which the passenger further pushes in manipulation knob 39 from the position at which protruding portion 52 and stopper portion 62 abut against each other in order to confirm that movable louver 12 will not pivot any further, for example, it is possible to suppress the force (the torque) acting on the abutting position between protruding portion 52 and stopper portion 62, detachment does not occur easily in the accommodation mechanism between ball portion 61 and bearing portion 42 (spherical surface portion 51), and it is possible to stably maintain the pivoting manipulability of movable louver 12.

When the passenger further pushes movable louver 12 using manipulation knob 39 in a state in which protruding portion 52 and stopper portion 62 abut against each other, the rear end portion of contour portion 34 of movable louver 12 may be caused to abut against a structure inside case body 11, for example, rectifying section 29 by pinching stopper portion 62. Since the distance between contour portion 34 of movable louver 12 and rectifying section 29 is minute from the state in which protruding portion 52 and stopper portion 62 abut against each other first, it is possible to suppress a hitting sound during the abutting of contour portion 34 of movable louver 12 and rectifying section 29 to an extremely small level, and by adding the stopper function caused by the abutting between each of contour portion 34 of movable louver 12 and rectifying section 29 in addition to the abutting between protruding portion 52 and stopper portion 62, it is possible to disperse a contact interference force at the pivoting end of movable louver 12.

By forming stopper portion 62 on ball portion 61, it is possible to cause the abutting position between protruding portion 52 and stopper portion 62 to further approach the accommodating position of bearing portion 42 (spherical surface portion 51) which accommodates ball portion 61, it is possible to further suppress the force acting on the abutting position between protruding portion 52 and stopper portion 62, and it is possible to more stably maintain the pivoting manipulability of movable louver 12.

By forming stopper portion 62 on soft member 55 which covers at least a portion of ball portion 61, it is possible to use soft member 55 which sets the pivoting load between ball portion 61 and bearing portion 42 (spherical surface portion 51) and suppress the hitting sound which occurs when movable louver 12 is swung to the pivoting end and protruding portion 52 and stopper portion 62 abut against each other. Since it is not necessary to prepare stopper parts including the soft member for suppressing the hitting sound and a mold for two color molding individually from link 43 including soft member 55 and a mold for link 43, it is possible to cheaply manufacture wind direction adjustment device 10 while suppressing the hitting sound which occurs due to the abutting between protruding portion 52 and stopper portion 62 when movable louver 12 is swung to the pivoting end.

By providing protruding portion 52 on bearing portion 42, it is possible to cause the abutting position between protruding portion 52 and stopper portion 62 to further approach the accommodating position of bearing portion 42 (spherical surface portion 51) which accommodates ball portion 61, that is, the pivoting center of movable louver 12, it is possible to further suppress the force (torque) acting on the abutting position between protruding portion 52 and stopper portion 62, and it is possible to stably maintain the pivoting manipulability of movable louver 12.

In the embodiment, although spherical surface portion 51 and protruding portion 52 are set to the movable louver 12 side and ball portion 61 and stopper portion 62 of soft member 55 are set to the case body 11 side, a configuration may be adopted in which spherical surface portion 51 and protruding portion 52 are set to link 43 of the case body 11 side and ball portion 61 and stopper portion 62 of soft member 55 are set to bearing portion 42 of the movable louver 12 side. Even in this case, it is possible to realize similar operations and effects to those of the embodiment.

Valves 16 and 17 are not essential configurations, for example, other arbitrary configurations controlling the opening/closing amount of flow path 26 may be applied such as opening and closing flow path 26 using blades 35 of movable louver 12.

Wind direction adjustment device 10 is not limited to being for vehicles and may be used in adjusting the wind direction of an arbitrary air conditioning apparatus or the like.

INDUSTRIAL APPLICABILITY

It is possible to favorably apply the present invention as a wind direction adjustment device for air conditioning of an automobile, for example.

REFERENCE SIGNS LIST

10 wind direction adjustment device
11 case body
12 movable louver
13 support section
39 manipulation knob serving as manipulation portion
42 bearing portion serving as ball accommodating portion
43 link serving as pivoting base portion
52 protruding portion serving as one abutting portion
55 soft member
61 ball portion
62 stopper portion serving as another abutting portion

What is claimed is:

1. A wind direction adjustment device comprising:
   a cylindrical case body;
   a movable louver provided with a contour portion and a manipulation portion; and
   a support section which pivotably supports the movable louver inside the case body,
   wherein the support section includes:
      a pivoting base portion which is provided on one of the case body side and the movable louver side,
      a ball portion which is provided on the pivoting base portion and at least a portion of the ball portion is positioned on a coaxial line with the manipulation portion at a neutral position of the movable louver,
      a ball accommodating portion which is provided on the other of the case body side and the movable louver side and accommodates the ball portion,
      one abutting portion which is provided on the movable louver, and
      another abutting portion which is provided on the pivoting base portion and sets a first pivoting end of the movable louver by abutting against the one abutting portion, and
   wherein a soft member is integrally provided with the ball portion and the another abutting portion, and
   the case body comprises a structure provided inside the cylindrical case body and setting a second pivoting end of the movable louver, and when the movable louver is further pushed using the manipulation portion in a state in which the one abutting portion and the another abutting portion abut against each other, the another abutting portion is pinched and a rear end portion of the contour portion abuts against the structure.

2. The wind direction adjustment device according to claim 1,
   wherein the another abutting portion is formed on the ball portion.

3. The wind direction adjustment device according to claim 2,
   wherein the another abutting portion covers at least a portion of the ball portion.

4. The wind direction adjustment device according to claim 1,
   wherein the one abutting portion is provided on the ball accommodating portion.

* * * * *